No. 739,570. PATENTED SEPT. 22, 1903.
G. K. WOODS.
FARRIER'S RASP.
APPLICATION FILED JUNE 5, 1903.
NO MODEL.
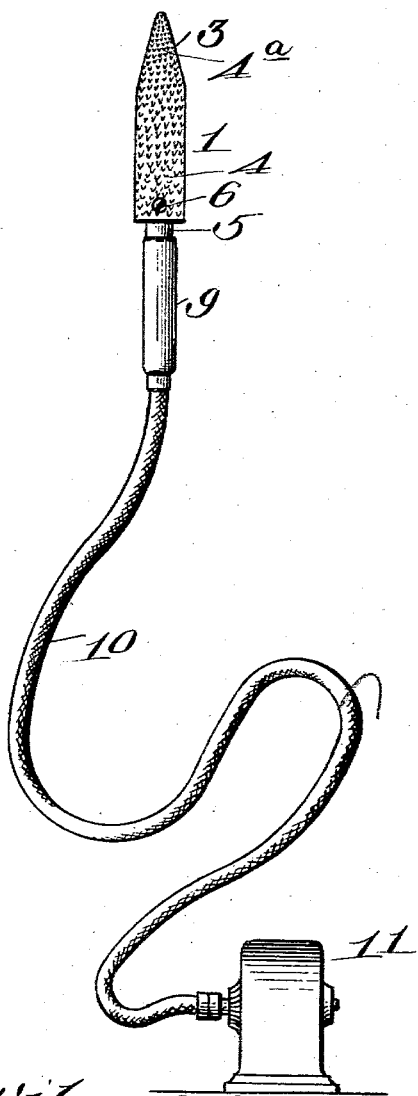
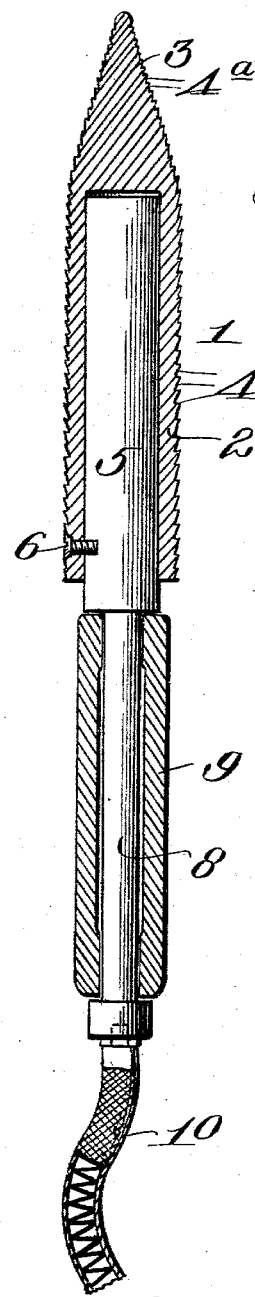
Witnesses:
C. D. Kesler.
James L. Norris, Jr.
Inventor
Green K. Woods
By James L. Norris
Atty.
THE NORRIS PETERS CO., PHOTO-LITHO., WASHINGTON, D. C.

No. 739,570. Patented September 22, 1903.

UNITED STATES PATENT OFFICE.

GREEN K. WOODS, OF PRESCOTT, ARIZONA TERRITORY.

FARRIER'S RASP.

SPECIFICATION forming part of Letters Patent No. 739,570, dated September 22, 1903.

Application filed June 5, 1903. Serial No. 160,254. (No model.)

*To all whom it may concern:*

Be it known that I, GREEN K. WOODS, a citizen of the United States, residing at Prescott, in the county of Yavapia and Territory of Arizona, have invented new and useful Improvements in Farriers' Rasps, of which the following is a specification.

This invention relates to a farrier's rasping-tool, and has for its object to provide an improved implement of the character referred to by means of which a horse's hoof may be quickly and properly dressed for the reception of the shoe and also which will enable the hoof to be afterward finished to make it properly conform to the shoe.

To this end it consists in the features and in the construction, combination, and arrangement of parts hereinafter described, and particularly pointed out in the claim following the description, reference being had to the accompanying drawings, forming a part of this specification, wherein—

Figure 1 is a view in elevation of my improved implement, and Fig. 2 is a central longitudinal sectional view.

Referring to the drawings, the numeral 1 indicates in a general manner the rasp, which consists of a hollow cylinder 2, which is tapered at one end to a point, as indicated at
3. The exterior of said cylinder is provided with numerous rasping or filing teeth 4, and its tapered end is also provided with teeth 4ª, which are smaller or finer than the teeth 4. Fitted within the hollow cylindrical rasp 1 is a cylinder 5, and said cylinder and rasp are rigidly united by a screw 6, which passes through the hollow cylinder 4 into the solid cylinder 5, as is more clearly shown in Fig. 2 of the drawings, the head of the screw being countersunk into the cylindrical rasp, as shown.

One end of the solid core or cylinder 5 projects slightly beyond the rear end of the cylinder-rasp and is provided at such projecting end with a reduced rod or cylindrical portion 8, on which is rotatably mounted a sleeve 9, forming a handle. To the end of the rod 8 is connected one end of the flexible shaft 10, the other end of which is connected to any suitable driving power—such, for example, as an electric motor 11.

The operation of my improved implement is as follows: The tapered end of the rasp is employed for filing or rasping in and around the frog of the foot to dress the inside of the horse's hoof. The cylindrical portion of the rasp is employed to rasp off and file the hoof before fitting and attaching the shoe to the hoof and is also employed to dress the hoof off after the shoe has been fitted thereon. During this operation the operator holds the tool by the rotatable handle 9, which, as has been before described, is loosely mounted on the rod 8, and is enabled to apply the rasp to the horse's hoof with accuracy, the flexible shaft 10 permitting the implement to be moved in every desired direction. When the cylindrical rasp becomes worn, it may be readily removed from the core 5 by simply unscrewing the screw 6, and it may be replaced by a new rasp, or the worn rasp may be repaired and replaced on the core.

Having described my invention, what I claim is—

In an implement of the character described, the combination with a hollow cylinder provided at one end with a tapered extension vanishing to a point, the exterior of the cylinder and extension being provided with rasping-teeth, the teeth on the extension being finer than those on the cylindrical portion of the implement, of a core removably fitted within the cylinder, a screw countersunk in the cylinder and connecting the latter and said core rigidly together, a reduced extension projecting from the rear end of the core, a hollow handle loosely sleeved on said extension, a flexible shaft connected at one end to the end of said reduced extension, and a motor for rotating said shaft, substantially as described.

In testimony whereof I have hereunto set my hand in presence of two subscribing witnesses.

GREEN K. WOODS.

Witnesses:
EUGENE A. ENGLE,
FRED BUNKER.